United States Patent [19]
Du et al.

[11] Patent Number: 5,719,866
[45] Date of Patent: Feb. 17, 1998

[54] LOCAL NETWORK OPERATING IN THE ASYNCHRONOUS TRANSFER MODE (ATM)

[75] Inventors: Yonggang Du, Aachen; Rolf Kraemer, Herzogenrath-Pannesheide, both of Germany

[73] Assignee: U.S. Philips Corporation, New York, N.Y.

[21] Appl. No.: 798,199

[22] Filed: Feb. 10, 1997

Related U.S. Application Data

[63] Continuation of Ser. No. 201,594, Feb. 25, 1994, abandoned.

[30] Foreign Application Priority Data

Feb. 27, 1993 [DE] Germany .................. 43 06 186.9

[51] Int. Cl.⁶ .................................................. H04L 12/42
[52] U.S. Cl. ..................... 370/396; 370/463; 370/222
[58] Field of Search ............................. 370/389, 395, 370/396, 397, 400, 401, 402, 403, 404, 405, 406, 420, 421, 422, 423, 424, 462, 463, 222, 223, 234, 221

[56] References Cited

U.S. PATENT DOCUMENTS 5,150,356  9/1992  Tsutsui ........................... 370/223
5,280,476  1/1994  Kojima et al. ................... 370/60.1
5,287,535  2/1994  Sakagawa et al. ............... 370/60.1
5,339,314  8/1994  Tanaka et al. .................. 370/85.15
5,392,286  2/1995  Tanaka et al. .................. 370/85.15

Primary Examiner—Wellington Chin
Assistant Examiner—Huy D. Vu
Attorney, Agent, or Firm—Brian J. Wieghaus

[57] ABSTRACT

The invention relates to a local network operating in the asynchronous transfer mode (ATM), comprising a plurality of stations (10) which are each coupled to transmitting and receiving ring lines (16, 19) via a network interface (9) which comprises at least one switch (11) and which stations are provided for transmitting cells. The switch (11) is arranged for relaying a user cell containing information relating to the user from a receiving ring line (16) to the transmitting ring line (19) and/or to the station (10) or from a station (10) to the transmitting ring line (19) in response to status information. Furthermore, the switch is used for relaying a control cell, used at least for storing switching functions, from a receiving ring line (16) to the transmitting ring line (19) and/or to a controller (24) controlling the switch (11) and/or to the station (10), or from the controller (24) to the transmitting ring line (19) and/or to the station (10), or from the station (10) to the transmitting ring line (19) and/or to the controller (24).

12 Claims, 2 Drawing Sheets ns. 5,719,866

LOCAL NETWORK OPERATING IN THE ASYNCHRONOUS TRANSFER MODE (ATM)

This is a continuation of application Ser. No. 08/201,594, filed Feb. 25, 1994 now abandoned.

BACKGROUND OF THE INVENTION

The invention relates to a local network operating in the asynchronous transfer mode (ATM), comprising a plurality of stations which are each coupled to transmitting and receiving ring lines via a network interface which comprises at least one switch and which stations are provided for transmitting cells.

Such a local network is known from the publication entitled "Ohne Chips nichts los—Standard-Chips für ATM-Systeme sind im Kommen" by Bernd Reder, Elektronik January 1993, pp. 66 to 75. In this paper, which gives a general view, the current development of integrated circuits used in local networks is discussed, which networks operate in the asynchronous transfer mode (ATM). Each station is then connected to the ring lines of the local network via network interfaces. Switches are used in the network interfaces to control the ATM cell stream.

When an asynchronous transfer mode is used in a system, payload, for example, telephone, picture or sound signals are sent in blocks of fixed lengths through arrangements for digital signal processing. A block of fixed length is denoted as a cell which contains a given number of bytes (for example, 53 bytes). Such a cell can be serially transferred over the digital arrangements i.e. bit by bit, or in parallel i.e. byte by byte. Each cell contains a header field having a length of, for example, 5 bytes, and an information field which accommodates the payload and has a length of, for example, 48 bytes. In such a header field are available routing identification codes, error recognition data and control data. Routing identification codes are meant to be understood as trunk identifiers and link identifiers. The link identifier, also referenced VCI (Virtual Channel Identifier), contains the description of the destination of the cell in the system. For transmitting a cell, a virtual channel is made available on account of the virtual channel identifier. As a rule, a VCI is changed each time an exchange is reached. A trunk group of various virtual channels is referenced a virtual path. A virtual path is featured by the trunk identifier. Such a virtual path is called a Virtual Path Identifier (VPI). Cells are assigned to consecutively determined periods of time. The length of such a period of time depends on the clock rate used as a basis of the switch components. If no payload is available, empty cells i.e. cells without payload, are transmitted in such a period of time. Cells containing payload are referenced payload cells.

SUMMARY OF THE INVENTION

It is an object of the invention to provide a local network operating in the asynchronous transfer mode, to which new stations can be simply extended or from which stations can be removed.

This object is achieved by a local network of the type defined in the opening paragraph, operating in the asynchronous mode, in that the switch is arranged for relaying, in response to status information, a user cell containing information that relates to a user from a receiving ring line to the transmitting ring line and/or to the station, or from a station to the transmitting ring line, for relaying a control cell used at least for storing switching functions from a receiving ring line to the transmitting ring line and/or to a controller controlling the switch and/or to the station, or from the controller to the transmitting ring line and/or to the station, or from the station to the transmitting ring line and/or to the controller.

In the local network according to the invention a distributed switch configuration is realised. At least the switches of each network interface represent the distributed switch configuration. It is then possible for each network interface to be used spatially separated in a ring configuration or in an exchange spatially together as a star point in a star configuration. Each network interface comprises a switch which distributes payload cells. The switch conveys user cells as payload cells and also control cells as payload cells. The information field of a user cell contains, for example, a message or data of the user of this link. If a virtual channel is used for transmitting speech signals (telephone conversation), the information field contains speech data. The information field of a control cell comprises control information which is necessary at least for switching functions. For example, a connection is established or broken off by means of the control cells. Furthermore, monitoring functions can also be realised with the control cells. In the switch there is determined to which destination the cell is to be transferred on the basis of an evaluation of the address contained in the header field of the cell.

The switch receives user cells either from the assigned receiving ring line or from the connected station. The user cells are transferred to the station and/or to the transmitting ring line. In the distribution mode, user cells coming from the receiving ring line are transferred to the station and to the transmitting ring line.

When control cells are received, the switch can perform similar said functions. Furthermore, control cells can be transferred from the connected station or from the assigned receiving ring line to a controller that controls the switch. Control cells can also be transferred from the receiving ring line to the station and from the station to the receiving ring line. The station can generate control cells, for example, via an automatic check, which cells are led back to the station via the switch. The control cells generated by the controller are transferred to the station and/or the assigned transmitting ring line.

The controller evaluates the control cells and carries out, for example, switching actions in response to the contents of the control cells, which actions are used in prior-art systems operating in the asynchronous transfer mode. For example, the controller can detect that the connection between the associated station and a further station is to be set up (request for a link). If such a link is possible, the controller generates at least one control cell which carries a message the controller is to receive from the station to which the link is to be set up. The controller may be realised, for example, by a microprocessor.

Actions are carried out in the switch as a function of its status. For example, if the station is not operable, cells are transferred directly from the receiving ring line to the transmitting ring line without an evaluation of the cell header being performed. If a station is in the initialization phase, only specific control cells are received and the other cells are transferred from the receiving ring line to the transmitting ring line. If a link exists between two stations, and one of them cannot provide a further link, all the control cells expressing a request for a link are ignored.

The use of network interfaces which are each coupled to a station and comprise user cells and control cells, or transfer these cells, creates a local network which can be simply expanded or reduced. If a station is not operable, a cell is simply relayed.

For storing the status of a station, a status register is coupled to the switch. The switch controller is provided for extracting the status of the station and of the switch from the status register. A status information signal is also written into the status register and changed by the controller.

The clock signal assigned to the cell streams on the ring lines can be selected to be the same for each ring line. Such a synchronization, however, is extremely costly because each network interface depends on a central clock signal. To avoid this costly and problematic ring line synchronization, each network interface is arranged for deriving a receive clock signal assigned to the incoming cell stream on the receiving ring line, and generating a transmitting clock signal decoupled from the receiving clock signal, which transmitting clock signal is assigned to the outgoing cell stream on the transmitting ring line.

Due to this measure the clock signals of adjacent ring lines are mutually decoupled.

The various clock signals of ring lines, network interfaces and station are matched by means of buffer memories. Each network interface then comprises a buffer memory between receiving ring line and switch for matching the cell stream with an internal clock signal, and a buffer memory between transmitting ring line and switch for matching the cell stream with the transmitting clock signal.

Furthermore, there is inserted between each network interface and its assigned station a buffer memory for matching the cell stream supplied by the network interface or to be received therefrom with at least one station clock signal.

For each network interface in the local network to be controlled or to control efficiently, such a network interface is provided to generate and receive cells which have different priorities. For example, the control cells can be assigned a higher priority than the user cells.

A control cell or a user cell generated by a network interface or a station comprises an indication about the service, the address and the type of cell. This information which is found in the header field of the cell is then evaluated in at least one other network interface or station. A service may be a telephone line, a data line and so on. The address indicates the station to which a cell is to be transmitted. The type of cell indicates whether it is a user cell or a control cell.

The bits reserved for the VCI (Virtual Channel Identifier) in the header field of the cell can be used for the information about the service and the bits reserved for the VPI (Virtual Path Identifier) in the header field of the cell can be used for the information about the address.

In the local network according to the invention a connection is established in the following manner. If a transmitter station has a request for a link to at least one receiver station, first at least one control cell containing an inquiry about the status of the receiver station is generated. At least one receiver station, once it has received the inquiry, sends out at least one control cell containing the information about its status. The transmitter station, once it has received the status information, forms at least one control cell for a connection set-up if the status of at least one receiver station makes a link possible.

Either station involved in the connection can initiate a disconnection. For this purpose the transmitter station or receiver station contains at least one control cell with a message about the disconnection.

In order that a station does not simultaneously monitor both the assigned transmitting and receiving ring lines during the connection set-up, a station is arranged only for monitoring the connection set-up in the transmitting direction or receiving direction.

BRIEF DESCRIPTION OF THE DRAWINGS

Embodiments of the invention will be further explained with reference to the drawing Figures, in which.

DETAILED DESCRIPTION OF THE PREFERRED EMBODIMENTS

Figure 1:
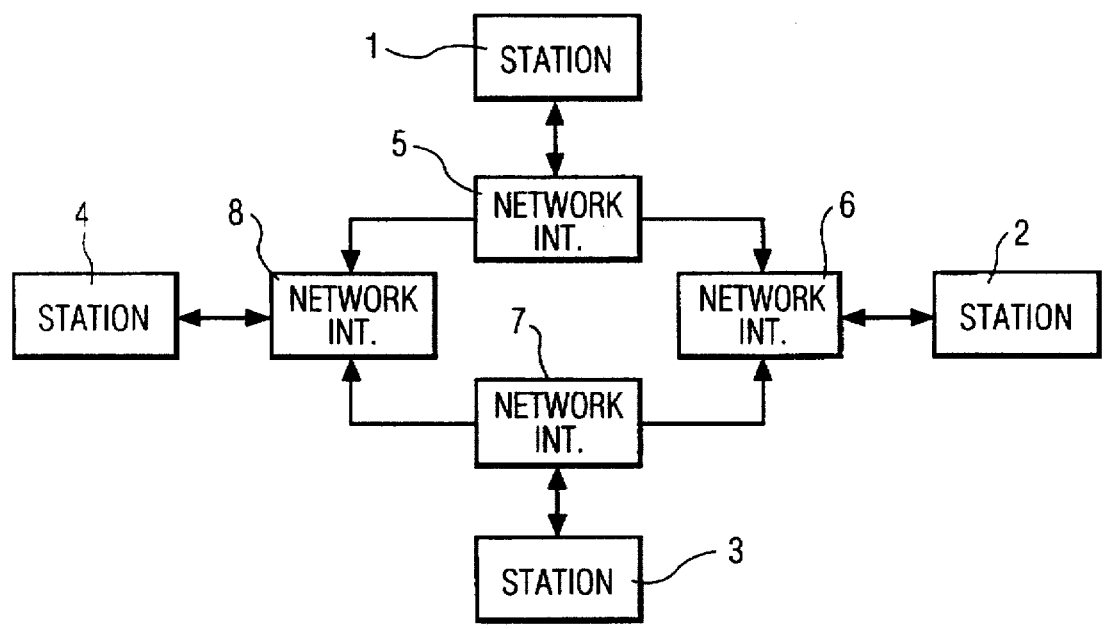
FIG. 1 shows a local network in a ring structure.

FIG. 1 shows an embodiment of a local network comprising 4 stations 1 to 4 which are each coupled to ring lines via associated network interfaces 5 to 8. The messages or information signals coming from the stations 1 to 4 or network interfaces 5 to 8 respectively, are transmitted in the asynchronous transfer mode by means of cells. A cell contains a header field of, for example, 5 bytes and an information field of, for example, 48 bytes. The information contained in the header field of the cell is specifically used for addressing and performing switching functions.

Figure 2:
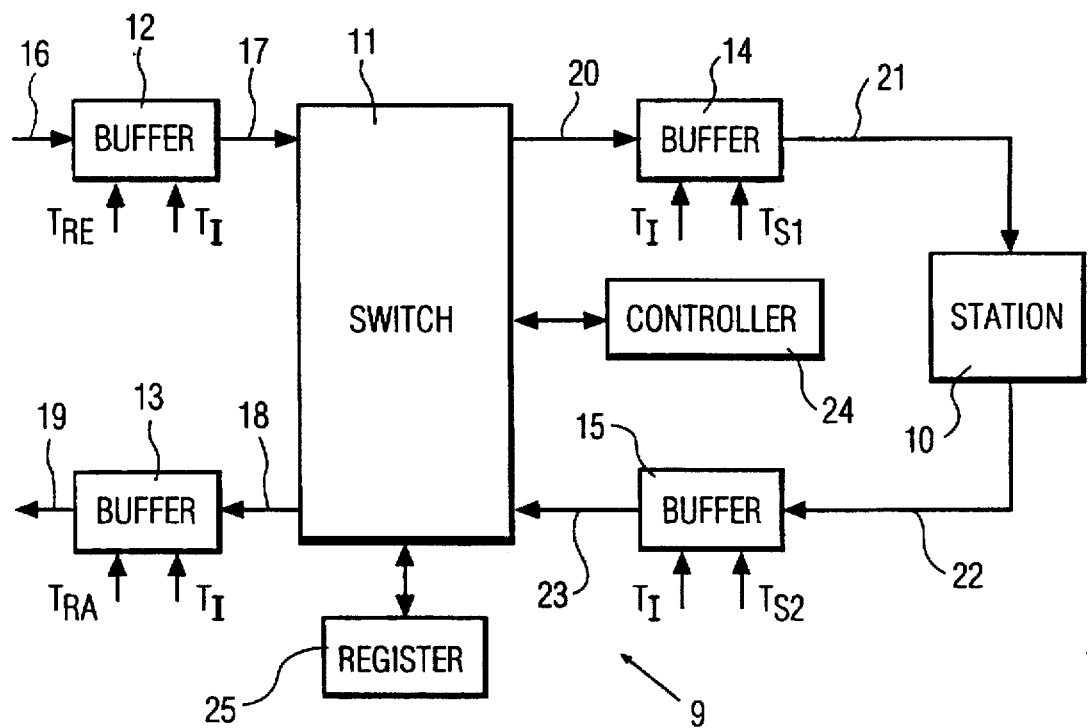
FIG. 2 shows a network interface with assigned station which can be used in the local network shown in FIG. 1.

A network interface 9 and an assigned station 10 are shown in more detail in FIG. 2. The network interface 9 comprises a switch 11 which is coupled to the ring lines and the station 10 via buffer memories 12 to 15 and relays the cell stream.

The buffer memory 12 is connected to the receiving ring line 16 and also to a line 17 which leads to the switch 11. The buffer memory 17 additionally receives a receiving clock signal $T_{RE}$ which is derived from the cell stream of the receiving ring line and receives an internal clock signal $T_I$ from a clock generator of the network interface 9. The buffer memory 13 is coupled to the switch 11 via a line 18 and supplies a cell stream to the transmitting ring line 19. The buffer memory 13 is supplied with the internal clock signal $T_I$ and a transmitting clock signal $T_{RA}$, which is derived, for example, from the internal clock signal $T_I$. The buffer memory 14, which contains a cell stream of the switch 11, is coupled, via a line 20, to the switch 11 and also, via a line 21, to the station 10. The buffer memory 14 is also supplied with the internal clock signal $T_I$ and a first station signal $T_{S1}$ supplied by the station 10. The buffer memory 15, which is supplied with the cell stream from the station 10, is coupled, via a line 22, to the station 10 and, via a line 23, to the switch 11. This buffer memory 15 receives a second station clock signal $T_{S2}$ and the internal clock signal $T_I$. In the buffer memories 12 to 15 the cell streams are matched with the clock signals. The deriving of the various clock signals from the cell stream and the generation of the internal clock signal $T_I$ will not be further discussed here. The station clock signals $T_{S1}$ and $T_{S2}$ may be equal, for example, to the internal clock signal $T_I$. In that case, no buffer memories 14 and 15 are necessary. The frequency of the clock signals $T_{S1}$, $T_{S2}$ and $T_I$ must not exceed the receiving clock signal $T_{RE}$ or the transmitting clock signal $T_{RA}$. The clock signal on a lowest-frequency ring line of the local network determines the transmission capacity of the local network.

The network interface 9 further comprises a controller 24 controlling the switch 11, which controller is used, for example, for establishing a connection and for realising a disconnection. The controller 24 which may be arranged as a microprocessor may receive and generate cells as does the station 10.

Two types of payload cells are transmitted over the ring lines. On the one hand, user cells containing, for example, messages or user data of a previously established connection in their information field and, on the other hand, control cells containing control data in their information field. A user cell arriving at the receiving ring line 16 can be relayed to the station 10 or, alternatively, to the transmitting ring line 19 by the switch 11. The switch 11 can also switch a user cell to station 10 and, simultaneously, to the transmitting ring line 19. A user cell generated by station 10 is only relayed to the transmitting ring line 19 by the switch 11. Control cells produced by the receiving ring line 16 can be transmitted to the station and/or to the transmitting ring line. In addition, a control cell can further be transmitted to the controller 24. Control cells generated by the controller 24 may arrive at station 10 and/or at the transmitting ring line 19. The control cells produced by the station 10 may be returned to station 10 via an automatic check. Furthermore, the control cells generated by station 10 can be transmitted to the controller 24 and/or the receiving ring line 19. Part of prior-art exchange operating in the asynchronous transfer mode can be used as switch 11.

In switch 11 first the header field of the cell is evaluated once a cell has been received. If the address contained in the header field does not match the address of station 10, the cell is relayed to the transmitting ring line 19. If the address in the header field of the cell matches the address of station 10, the cell is relayed to station 10 and/or to the controller 24. Alternatively, it is conceivable that the control cell is also relayed to the transmitting ring line 19.

Certain bits in the header field of the cell are reserved for the VCI (Virtual Channel Identifier). This identifier contains, according to standardization proposals, the destination of a cell and identifies in this manner a virtual channel. Furthermore, specific bits in the header field of the cell are reserved for the VPI (Virtual Path Identifier). These bits contain an identifier of the virtual path. In a local network having an estimable number of subscribers, a path identifier is not necessary. As a result, the VPI can contain information about the address or destination. The VCI can contain an identifier of the service used. A service is understood to denote the description whether speech signals, data signals and so on are transmitted.

The switch 11 is further connected to a status register 25 which stores the state or status of station 10 of the switch 11. Before the switch 11 performs a coupling function, the controller 24 checks the status in the status register 25. For example, the switch 11 switches no cell to the station 10 if the status register 25 contains a message that station 10 is switched off. In that case, each cell is relayed from the receiving ring line 16, via the buffer memory 12, line 17, switch 11, line 18 and buffer memory 13, to the transmitting ring line 19. In the initialization state of station 10 (for example, when station 10 is switched on), only certain types of control cells originating from the receiving ring line 16 are relayed to the controller 24 or station 10. Each other cell is relayed from the receiving ring line 16 to the transmitting ring line 19.

Furthermore, the switch 11 is capable of handling specific cells with a higher priority. If the receiving ring line 16 produces a user cell and the controller 24 simultaneously produces a control cell, and if the two cells are to be relayed to station 10, first the control cell coming from the controller 24 is sent to the station 10 and, subsequently, the user cell coming from the receiving ring line 16. A priority list can aim be stored in the status register 25.

As observed hereinbefore, the control cells are used for control purposes. If there is a request for a connection from station 4 to station 2 (compare FIG. 1), first a control cell is generated by station 4. This control cell has in its information field an inquiry about which status station 2 is in. With this status inquiry there should be determined whether a connection having the necessary capacity can be established. The address of station 2 is indicated in the header field of the cell. Once the control cell has been received at station 2, this station transmits a control cell containing information about the status. This control cell contains the address of station 4 in the header field of the cell. After these control cells sent out by station 2 have been received, station 4 checks whether a connection is possible. If this connection can be established, station 4 sends a control cell to station 2 which cell contains signalling information for the call set-up. For example, it is possible to use signalling protocols which are known from systems operating in the asynchronous transfer mode.

In the event of a disconnection either station 2 or station 4 can generate a control cell which contains a message about the disconnection. Here too it is possible to use a prior-art signalling protocol.

The controller 24 in the network interface 9 can further be used for the purpose of statistical examination and monitoring. For example, a station, when establishing a connection, may be arranged only for detecting the available capacity of the ring line in the transmitting or receiving direction. For example, during the establishing of a connection between station 4 and station 2 (see FIG. 1) it is possible for station 4 to monitor the link in its transmitting direction i.e. in the receiving direction of station 2, and for station 2 to monitor same in its transmitting direction i.e. in the receiving direction of station 4.

Figure 3:
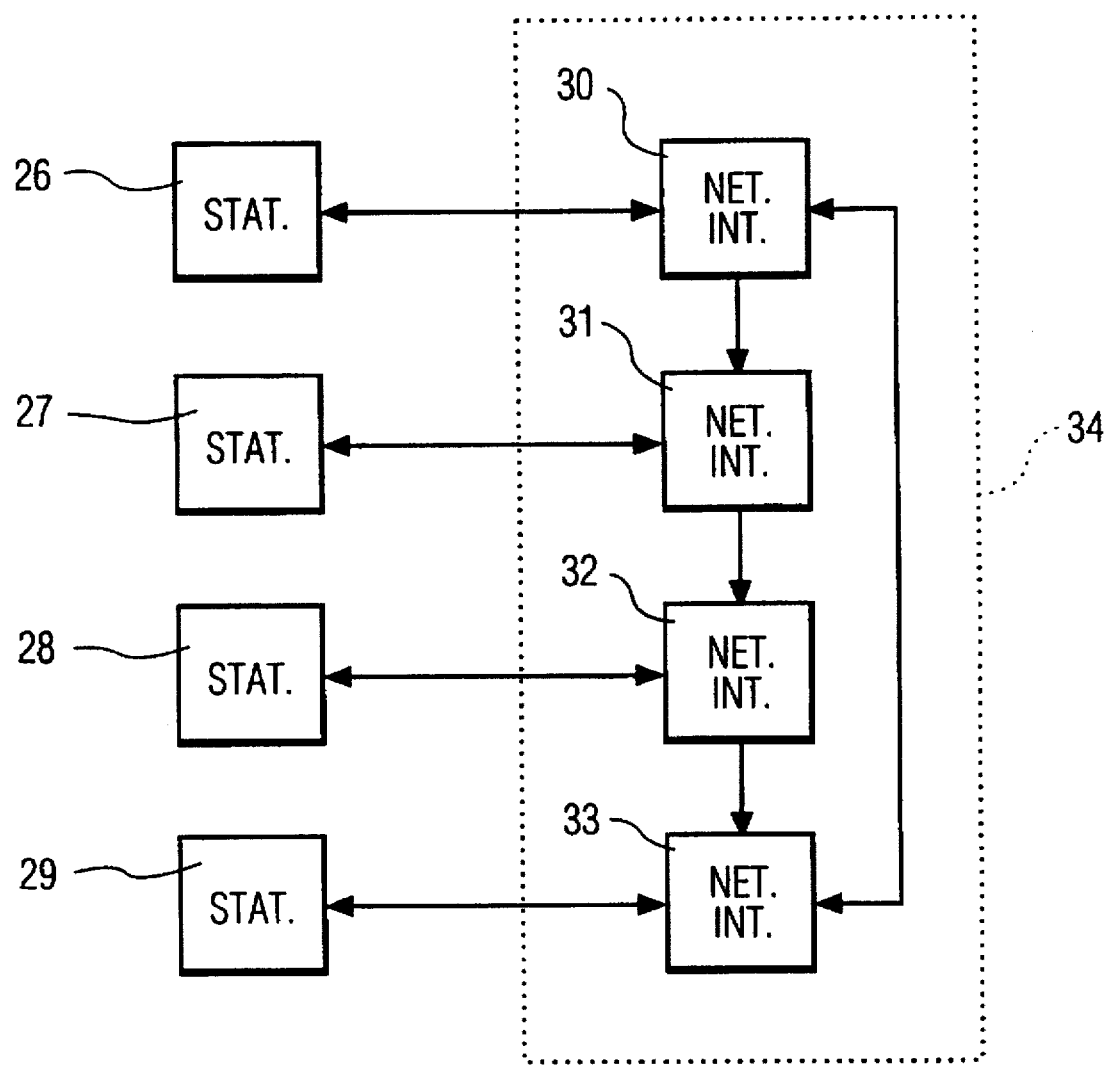
FIG. 3 shows a local network in a star configuration.

FIG. 1 shows a local network having a ring configuration. A local network, however, may also have a star configuration as shown in FIG. 3. Four stations 26 to 29 are shown which are each coupled to a network interface 30 to 33 respectively. The stations are intercoupled via ring lines. The network interface 30 is coupled in the transmitting direction to the network interface 31, the network interface 31 in the transmitting direction to the network interface 32, the network interface 32 in the transmitting direction to the network interface 33 and the network interface 33 in the transmitting direction to the network interface 30. The arrangement of the local network in a star configuration provides that the network interfaces 30 to 33 form an exchange 34 (starpoint).

We claim:

1. A local network operating in an asynchronous transfer mode, comprising a plurality of stations which are coupled to transmitting and receiving ring lines via a network interface which comprises at least one switch and which stations are provided for transmitting cells, wherein the switch is arranged for selectively relaying, in response to status information, a user cell containing information that relates to a user from:

a receiving ring line to one of the transmitting ring line and the station;

the station to the transmitting ring line for relaying a control cell used at least for storing switching functions;

the receiving ring line to one of the transmitting ring line, a controller controlling the switch and the station;

the controller to one of the transmitting ring line and the station, and the station to one of the transmitting ring line and the controller.

2. Local network as claimed in claim 1, characterized in that a status register is coupled to the switch and in that the controller is provided for extracting the status of the station and of the switch from the status register.

3. Local network as claimed in claim 1, characterized in that each network interface is arranged for deriving a receiving clock signal which is assigned to the incoming cell stream over the receiving ring line, and is arranged for generating a transmitting clock signal decoupled from the receiving clock signal, which transmitting clock signal is assigned to the outgoing cell stream over the transmitting ring line.

4. Local network as claimed in claim 3, characterized in that each network interface (9) comprises a buffer memory between receiving ring line and switch for matching the cell stream with an internal clock signal, and a buffer memory between transmitting ring line and switch for matching the cell stream with the transmitting clock signal.

5. Local network as claimed in claim 1, characterized in that between each network interface and the associated station buffer memories are provided for matching the cell stream produced by the network interface (9) or to be received thereby at least with a station clock signal.

6. Local network as claimed in claim 1, characterized in that each network interface is provided for transmitting and receiving cells with different priorities.

7. Local network as claimed in claim 1, characterized in that each network interface or each station is provided for inserting an entry about the service, the address and the type of cell into the header field of a cell to be transmitted.

8. Local network as claimed in claim 7, characterized in that the bits reserved for the VCI (Virtual Channel Identifier) in the header field of the cell contain information about the service and the bits reserved for the VPI (Virtual Path Identifier) contain the information about the address.

9. A local network operating in an asynchronous transfer mode, comprising a plurality of stations, which stations are coupled to transmitting and receiving ring lines via a network interface which comprises at least one switch, and which stations are provided for transmitting cells, wherein the switch is arranged for selectively relaying, in response to status information, a user cell containing information that relates to a user from:

a receiving ring line to one of the transmitting ring line and the station;

the station to the transmitting ring line for relaying a control cell used at least for storing switching functions the receiving ring line to one of the transmitting ring line, a controller controlling the switch and the station;

the controller to one of the transmitting ring line and the station, and the station to at least one of the transmitting ring line and the controller;

wherein a transmitter station, in the event of a request for a link to at least one receiver station, is first provided for generating at least one control cell containing an inquiry about the status of the receiver station, in that at least the receiver station, once it has received the inquiry, is arranged for sending out at least one control cell containing the information about its status, and in that the transmitter station, once it has received the status information, is provided for forming at least one control cell for a connection setup if the status of at least one receiver station makes a link possible.

10. Local network as claimed in claim 9, characterized in that the transmitter or a receiver station is provided for generating at least one control cell which contains a message about the connection set-up.

11. Local network as claimed in claim 1, characterized in that a station is always arranged for only monitoring the connection set-up in one of the transmitting and receiving direction.

12. A network adaptor for a local network operating in the asynchronous transfer mode to which are coupled a station and transmitting and receiving ring lines and which comprises at least one switch for transmitting cells, wherein the switch, in response to status information, is arranged for selectively relaying a user call containing information relating to a user:

from the receiving ring line to at least one of the transmitting ring line and the station;

from the station to the transmitting ring line;

when relaying a control cell used at least for storing switching functions, from a receiving ring line to at least one of the transmitting ring line, a controller controlling the switch and the switch; and from the controller to at least one of the transmitting ring line and the station.

* * * * *